United States Patent [19]
Pitney

[11] 3,977,724
[45] Aug. 31, 1976

[54] LAP BELT TIGHTENER
[75] Inventor: Lennord L. Pitney, Park Rapids, Minn.
[73] Assignee: The United States of America as represented by the Secretary of the Army, Washington, D.C.
[22] Filed: July 11, 1975
[21] Appl. No.: 595,193

[52] U.S. Cl. ............................ 297/385; 280/744
[51] Int. Cl.² ....................................... A62B 35/00
[58] Field of Search .................. 297/385, 386, 389; 280/150 SB, 150 AB; 244/122 A, 122 B, 122 R

[56] References Cited
UNITED STATES PATENTS

| | | | |
|---|---|---|---|
| 3,239,273 | 3/1966 | Pitney | 297/385 |
| 3,871,683 | 3/1975 | Otani | 280/150 SB |
| 3,874,694 | 4/1975 | Stephenson | 280/150 AB |
| 3,879,054 | 4/1975 | Lindblad | 280/150 SB |

FOREIGN PATENTS OR APPLICATIONS

| | | | |
|---|---|---|---|
| 1,258,697 | 7/1960 | France | 297/385 |

*Primary Examiner*—James T. McCall
*Attorney, Agent, or Firm*—Nathan Edelberg

[57] ABSTRACT

Lap belt tightening apparatus for aircraft seat belts and which becomes operational immediately prior to occupant seat ejection from a disabled aircraft. The apparatus includes simplified means for providing gas powered actuation to fluid cylinder controlled belt-tightening mechanisms and provides an economical arrangement of minimized weight.

3 Claims, 5 Drawing Figures

LAP BELT TIGHTENER

The invention described herein may be manufactured, used and licensed by or for the Government for governmental purposes without the payment to me of any royalty thereon.

This invention relates to lap belt tightening apparatus such as that disclosed in my prior U.S. Pat. No. 3,239,273 and has for an object to provide such lap belt tightening arrangements which have simplified means for providing gas powered actuation to fluid cylinder controlled belt tightening mechanisms. Another object is to provide such economical arrangements in which their weight is minimized.

These and other objects, features and advantages may become more apparent from the following description and accompanying drawings in which.

Figure 1:
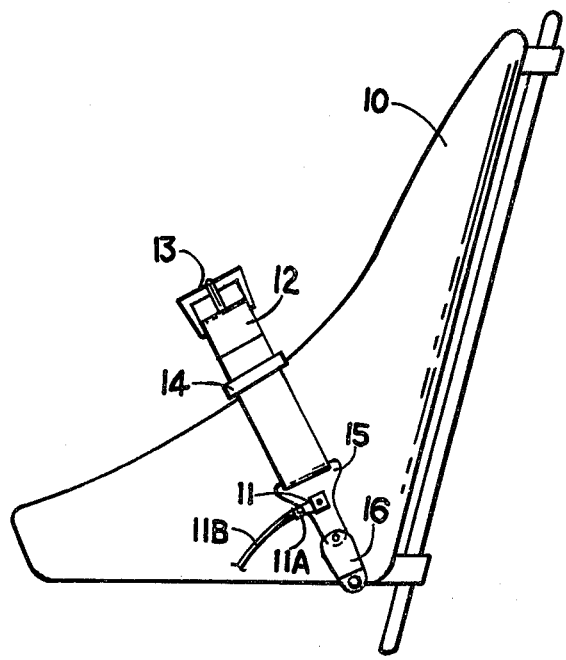
FIG. 1 shows a representation of an aircraft ejection seat.
Figure 2:
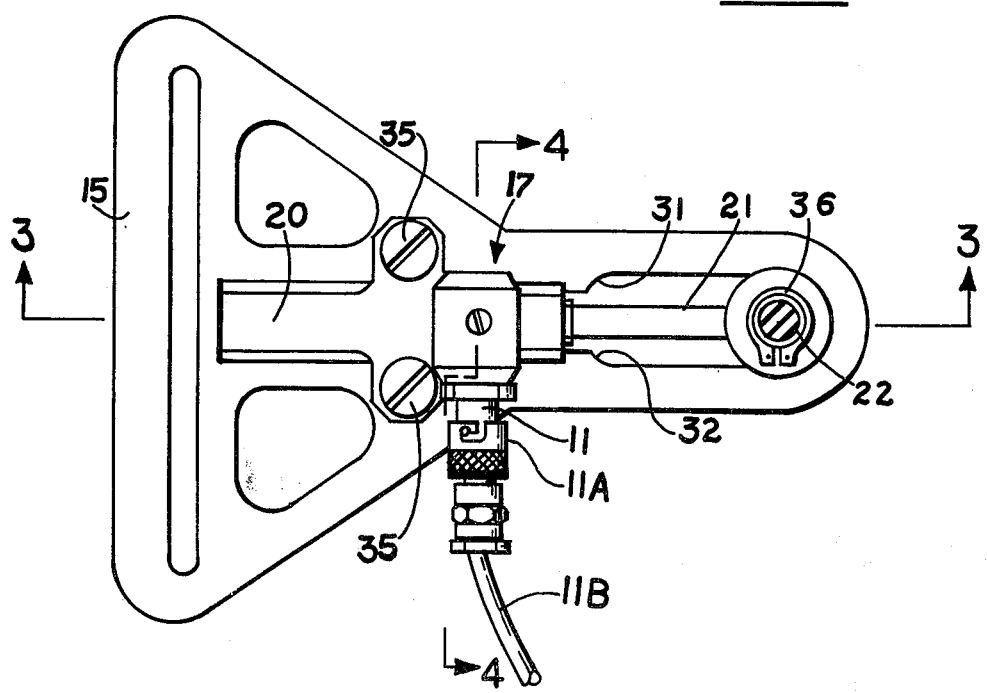
FIG. 2 is a plan view of an anchor loop to which the fluid pressure motor is attached.

An ejection seat 10 (FIG. 1), for emergency ejection (by means not shown) of personnel from a disabled aircraft, has a seat belt 12 which is usually of web type material about 3 inches wide. Some usual locking and unlocking mechanism such as a buckle 13 or clasp enables the belt to be quickly fastened or unfastened while the ends are fastened to the seat or its frame. Since personnel are oftentimes different in size or contour, some usual form of adjusting buckle 14 is found convenient. An anchor loop 15 shown more clearly in FIG. 2 carries a motor shown generally at 17 for tightening the belt 12 quickly. A similar anchor loop 15 and motor 17 is placed on the opposite side or end of the belt. Each loop 15 is firmly attached to a fixed support 16 on the seat. By this arrangement each motor contributes about half the shortening or tightening effect of the belt. The motor is constructed so that it will shorten the belt on each side by about one inch under a pressure of not more then about 35 to 50 pounds.

Figure 4:
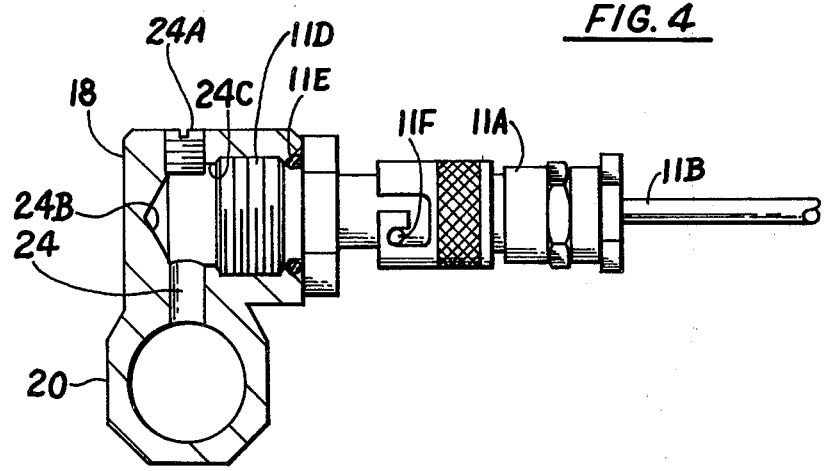
FIG. 4 is partial sectional view taken along line 4 — 4 of FIG. 2 with certain parts omitted.

An electric ignition element 11 (FIGS. 1,2,4) is mounted on each motor 17 respectively located on each side of seat 10. Each electric ignition element has secured thereto a bayonet connector 11A and associated electric lead wire 11B for connection to a lanyard sequential switch (not shown) that is actuated when an emergency ejection situation occurs to simultaneously energize both electric ignition elements 11 on each side of seat 10. Upon simultaneously firing the propellant in each electric ignition element 11, pressure causes relative motion between the fixed motor shaft 21 or its integral piston 28 and the cylinder 20 to tighten the belt as will be hereinafter described.

Integral with and extending laterally or above each cylinder 20 is a respective tightener housing member 18 (FIG. 4) having a vertical passageway or port 24, the upper end of which is tapped and is sealingly closed with a threaded set screw 24A and an appropriate amount of sealant or epoxy cement. In fluid communication with each housing passageway 24 and inclined normal thereto is a relatively large sized recess 24B, the cylindrical sidewall of which has a predetermined length of internally threaded surface 24C for securely mounting the externally threaded portion 11D of the corresponding electric ignition element 11. Each electric ignition element 11 carries an O-ring seal 11E for sealing the mouth of its mounting recess 24B upon assembly and a lug or protuberance 11F that facilitates securement of its bayonet connector 11A.

Figure 3:
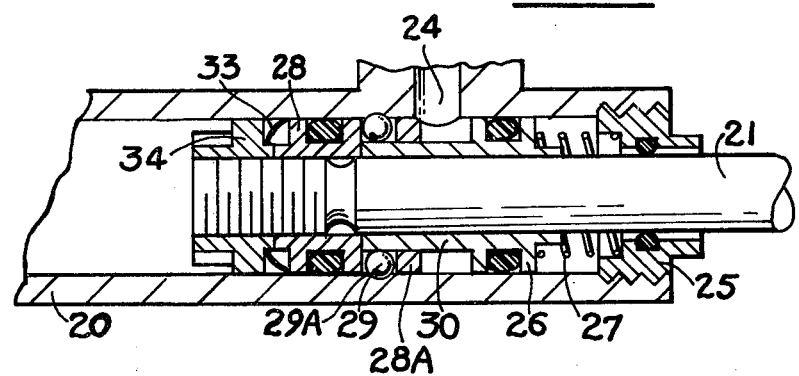
FIG. 3 is a partial sectional view of the cylinder and piston details taken along line 3 — 3 of FIG. 2.

Gas pressure generated by each electric ignition element 11 enters the corresponding admission port 24 leading into the respective cylinder 20. Gas pressure moves O-ring retainer 26 to the right (FIG. 3) compressing the coil spring 27 against an end wall 25 threaded into the cylinder 20. As retainer 26 moves to the right, its integral sleeve 30 also moves a short distance to the right to uncover or unlock balls 29 which previously had been locked or seated in their locking groove 29A formed in the cylinder internal wall between piston portion 28 and 28A which are interconnected by means not shown.

The uncovered balls 29 are thus freed from their locking groove 29A, and relative movement between cylinder 20 and its piston 28 and fixed end 21 is no longer restricted. Since shaft 21 and piston 28 are attached to a fixed pin connection 22, the cylinder 20 as well as the loop 15 are thus moved to the right to draw the belt tighter. This apparatus and the quantity of propellant used are so proportioned that the anchor loop 15 cannot move more than about one inch or until its bifurcated stop portions 31, 32 abut the pin and ring connection 22. It is contemplated that a sufficiently generated gas pressure in the system will produce a predetermined load on each belt end such that the resultant pressure by the belt upon a seat-occupant will not exceed about 35 to 50 pounds, regardless of the amount of anchor loop travel before the apparatus reaches a lock position. The locking or bent spring washer 33 acts as a stop permitting movement of the cylinder 20 to the right on shaft 21 but not motion in an opposite direction.

After the ejected seat has been recovered, the motor 17 may be disconnected from the anchor loop 15 by removing the bolts 35 and the snap ring 36 from the connection 22. The piston 28 and shaft 21 may be moved out of the open left end of the cylinder 20, and the jam nut 34 and the flexible spring stop washer 33 removed for reassembly and subsequent use of the entire belt tightening apparatus.

Figure 5:
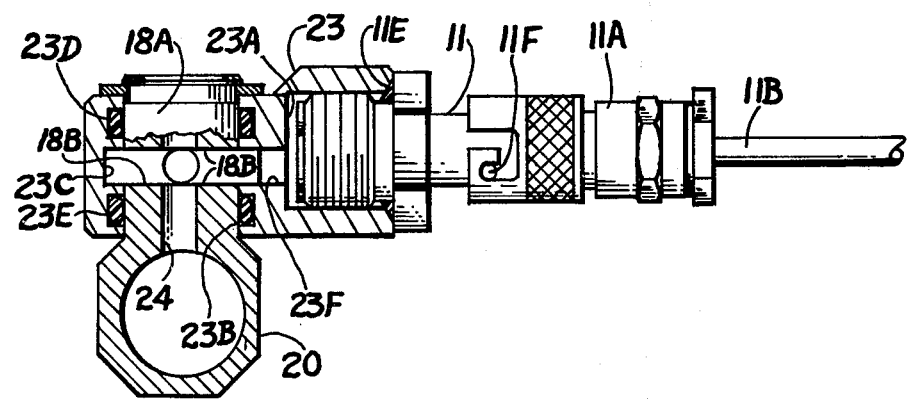
FIG. 5 is a view similar to FIG. 4 of a modified arrangement.

In the FIG. 5 modification, integral with and extending laterally or above each cylinder 20 is a respective tightener housing member 18A which is cylindrical configuration to form or provide a post for swivelly mounting a corresponding adapter 23. Each adapter 23 has a relatively large sized internally threaded recess 23A for similarly mounting the externally threaded portion of a respective electric ignition element 11 with an O-ring seal 11E properly positioned at the recess mouth. Each vertically extending cylindrically surfaced hub opening 23B has a central annular recess or passageway 23C, intermediate upper and lower O-ring seals 23D, 23E, which is in fluid communication with recess 23A via passage 23F and with the housing vertical passageway or port 24 via an aligned plurality of horizontally extending through bores 18B that centrally intersect with each other and passageway 24. The upper end of each tightener housing member 18A has a similar sealing set screw (not shown) and an appropriate head element to secure retaining ring 18C upon assembly of the corresponding adapter on its port 18A.

Gas pressure will thus simultaneously flow from a pair of simultaneously fired electric ignition elements 11, through fluid communicative passages 23A, 23F, 23C, 18B and 24 to cause a similar operation within the corresponding cylinders 20 as aforementioned.

Various modifications, alterations or changes may be resorted to without departing from the scope of the invention as defined in the appended claims.

I claim:

1. In lap belt tightener apparatus for use with aircraft seat belts,
   an anchor loop adapted to be secured to a fixed seat support of an aircraft,
   said anchor loop having means at one end for attaching a seat belt and means including an elongated slot at another end for slidable connection to a fixed seat support,
   a piston and cylinder arrangement respectively secured to said seat support and anchor loop, said cylinder including means responsive to selectively delivered fluid pressure for imparting belt tightening motion to said cylinder and anchor loop,
   a tightener housing member integral with and extending laterally of said cylinder, and
   means mounting an electric ignition element on said tightener housing member,
   said ignition element having a lug releasably secured to a slotted bayonet connector on an electric wire,
   said tightener housing member having a passageway for delivering pressure fluid developed by said electric ignition element to said cylinder.

2. The structure in accordance with claim 1 wherein said mounting means includes an internally threaded recess in said tightener housing member and in fluid communication with said passageway, and said electric ignition element is sealingly secured in said threaded recess.

3. The structure of claim 1 wherein said mounting means includes an adapter swively connected to said tightener housing member, said adapter having an internally threaded recess, said recess being in fluid communication with said passageway, and said electric ignition element is sealingly secured in said threaded recess.

* * * * *